C. D. HALDEMAN.
FARM GATE.
APPLICATION FILED APR. 5, 1910.
1,033,394.
Patented July 23, 1912.
3 SHEETS—SHEET 1.
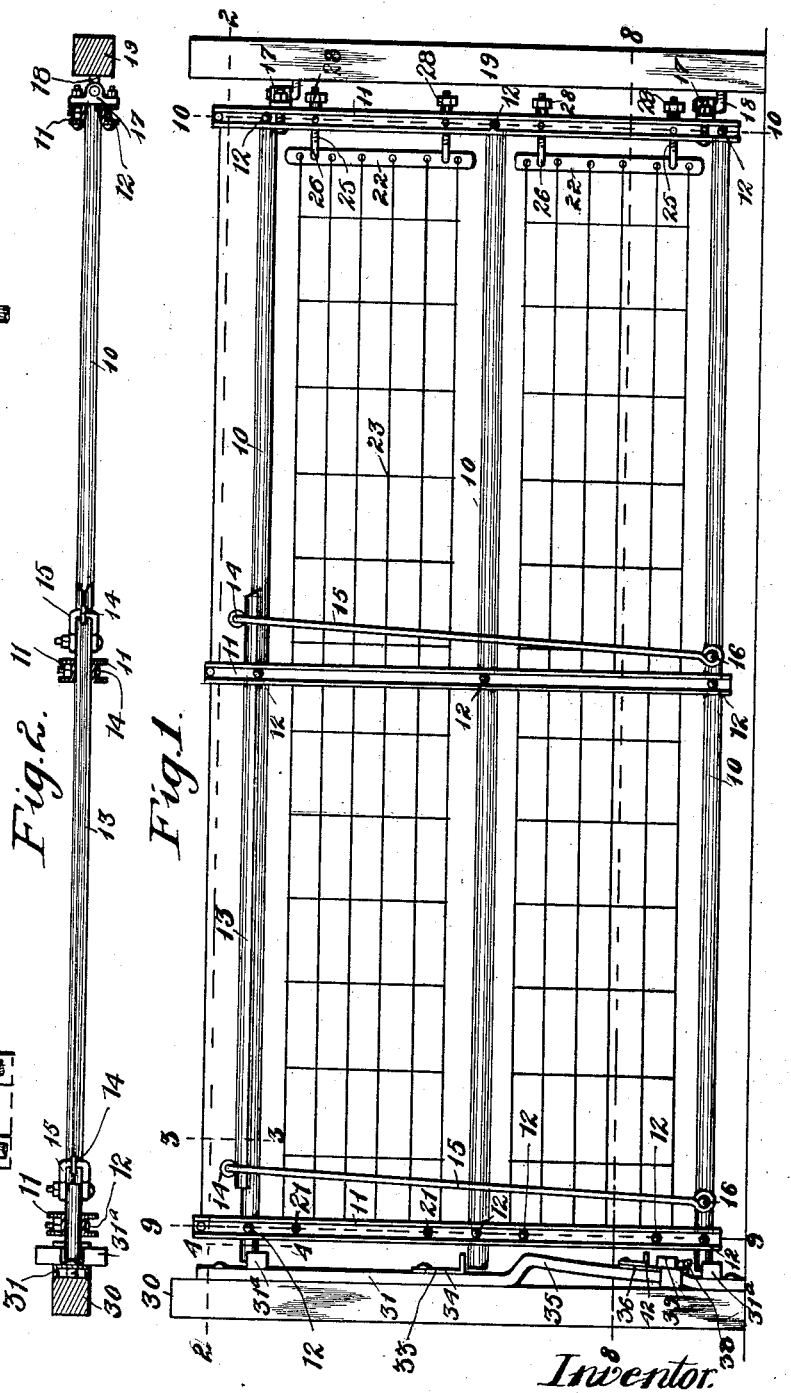
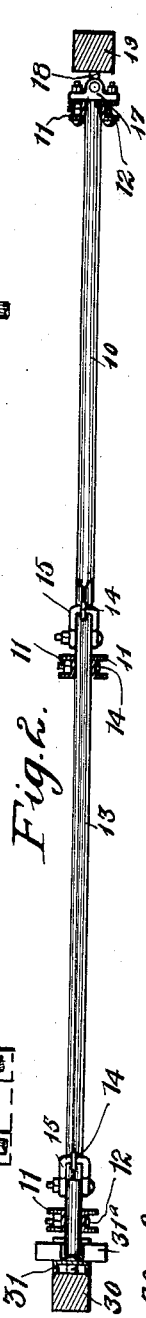
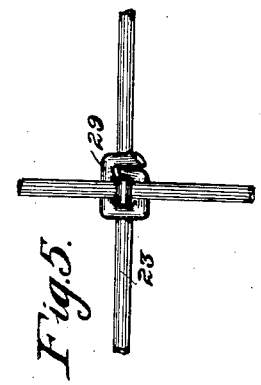
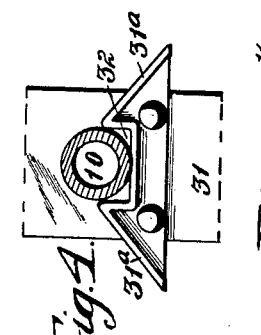
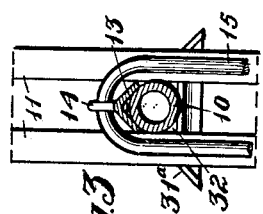
Witnesses
W. A. Loftus.
A. G. Hague
Inventor.
C. D. Haldeman
by J. Ralph Orwig, Atty.

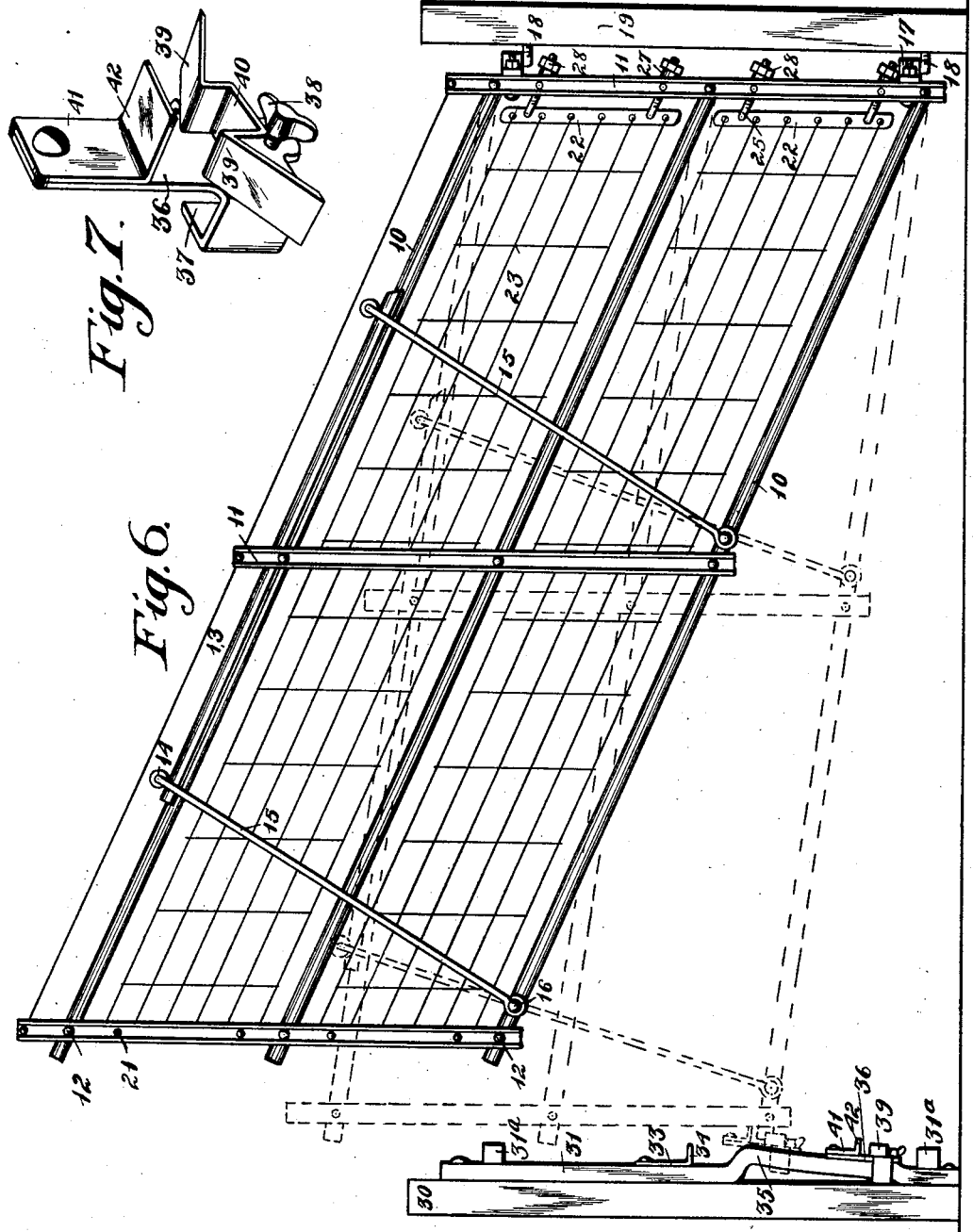

C. D. HALDEMAN.
FARM GATE.
APPLICATION FILED APR. 5, 1910.
1,033,394.
Patented July 23, 1912.
3 SHEETS—SHEET 3.
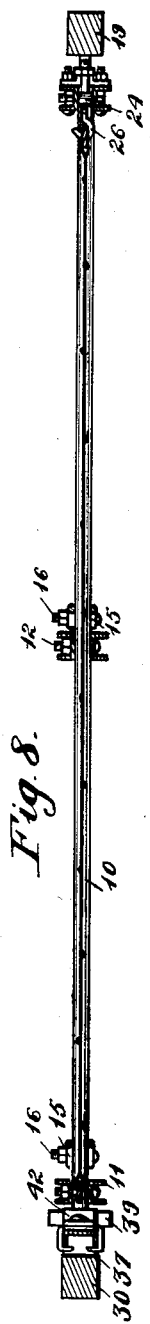
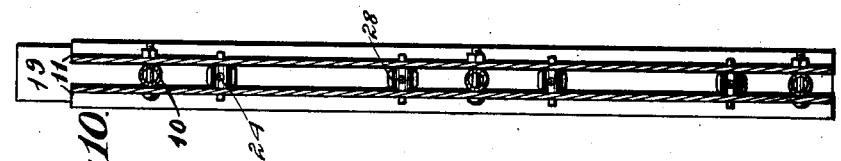
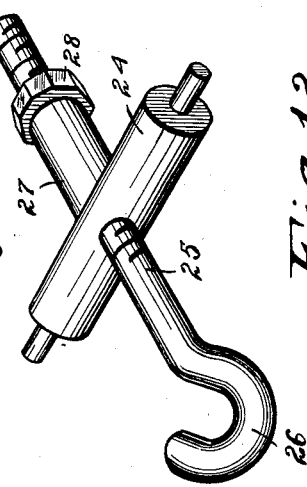
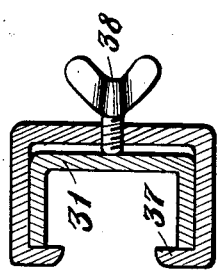
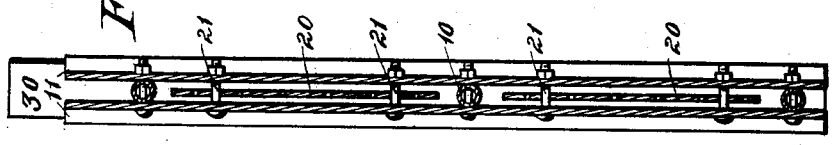
Witnesses.
W. A. Loftus.
A. G. Hague
Inventor.
C. D. Haldeman.
by J. Ralph Orwig Atty.

UNITED STATES PATENT OFFICE.

CHARLES D. HALDEMAN, OF MILO, IOWA, ASSIGNOR TO HALDEMAN MFG. COMPANY, OF INDIANOLA, IOWA, A CORPORATION OF SOUTH DAKOTA.

FARM-GATE.

1,033,394. Specification of Letters Patent. Patented July 23, 1912.

Application filed April 5, 1910. Serial No. 553,667.

*To all whom it may concern:*

Be it known that I, CHARLES D. HALDEMAN, a citizen of the United States, residing at Milo, in the county of Warren and State of Iowa, have invented a certain new and useful Farm-Gate, of which the following is a specification.

The object of my invention is to provide a farm gate of simple, durable and inexpensive construction so arranged that it may readily, quickly and easily be adjusted so that its free end will be at any desired elevation relative to its hinged end and also so arranged that it may be readily, quickly and easily adjusted to permit its free end to rest upon the ground or other suitable support to thereby relieve the gate post to which the gate is hinged of all strain caused by the gate and also to prevent the gate from swinging when wholly or partially open.

A further object is to provide a gate of this kind having woven wire fence material therein and so arranged that the free end of the gate may be elevated relative to the hinged end without altering or changing the tension of any part of said wires.

A further object is to provide a gate of this kind that may be made of longitudinal metal pipes and upright structural metal gate members pivotally connected and so arranged that the ends of the pipes at the free end of the gate will project beyond the upright members for use in supporting the gate on suitable latch devices.

A further object is to provide a gate of this kind in which the woven wire gate members may be readily, quickly and easily detached and the gate itself collapsed so as to occupy a minimum of space for shipping and storing purposes.

A further object is to provide an improved supporting device for the free end of the gate capable of being adjusted to thereby support the free end of the gate at different degrees of elevation and to firmly hold it in said position.

My invention consists in certain details, in the construction, arrangement and combination of the various parts of the device, whereby the objects contemplated are attained, as hereinafter more fully set forth, pointed out in my claims and illustrated in the accompanying drawings, in which:

Figure 1 shows a side elevation of a gate embodying my invention in closed position. Fig. 2 shows a sectional view of same on the line 2—2 of Fig. 1. Fig. 3 shows a sectional view on the line 3—3 of Fig. 1 on an enlarged scale. Fig. 4 shows a sectional view on the line 4—4 of Fig. 1 on an enlarged scale. Fig. 5 shows an enlarged, detail view illustrating the joints in the overlapping portions of the woven wire gate fabric. Fig. 6 shows a side elevation of a gate embodying my invention shown in position with its free end elevated. Fig. 7 shows an enlarged, detail, perspective view of the adjustable gate supporting device. Fig. 8 shows a sectional view on the line 8—8 of Fig. 1. Fig. 9 shows a sectional view on the line 9—9 of Fig. 1. Fig. 10 shows a sectional view on the line 10—10 of Fig. 1. Fig. 11 shows an enlarged, detail, perspective view of the adjustable pivoted hook device for supporting the woven wire fence members, and Fig. 12 shows a sectional view through the adjustable gate supporting member on an enlarged scale.

Referring to the accompanying drawings, my improved gate is seen to be composed of a number of longitudinal metal tubes 10: in the present instance three are shown, and a number of upright members 11 preferably made of structural metal, said upright members being arranged in pairs on opposite sides of the tubes 10 and being pivotally connected therewith by bolts 12. The said tube members 10 at the free end of the gate are arranged to project beyond the adjacent upright members 11 so that said projecting ends may be utilized to coact with the gate supporting members hereinafter described. Slidingly mounted on top of the upper gate member 10 is an angle bar 13 with its substantially concave side in engagement with the top of the upper gate member 10. This angle bar 13 forms a frictional gate supporting device and is of a length to project between the central upright gate members 11. At each of the opposite ends of the angle bar 13 I have provided an eye bolt 14 and extended through each eye bolt is a rod 15, the sides of which extend downwardly on opposite sides of the gate and are pivotally connected by means of bolts 16 with the lower horizontal gate member 10. These rods 15 are arranged in parallel positions relative to each other and by thus extending on opposite sides of the gate they provide means for holding the friction gate supporting member 13 in its position on the upper gate member 10. Fixed to the upright gate members 11 at the hinged end of the gate are two hinged members 17 of ordinary construction to connect with the stationary hinged members 18 secured to a gate post 19.

I have provided for filling in the gate between the horizontal gate members 10 with woven wire gate members as follows: Arranged between the uprights 11 at the free end of the gate are two straight metal bars 20 detachably connected by bolts 21 and adjacent to the uprights 11 near the hinged end of the gate are two similar bars 22. All of these parts are perforated and a length of woven wire indicated by the numeral 23 is connected to the two upper bars and another one to the two lower bars. I provide for supporting the bars 22 in such a manner that the tension of the wires 23 may be adjusted to suit the requirements and also in such a manner that the said bars 22 may move vertically relative to the adjacent upright gate members and still remain in positions parallel therewith when the free end of the gate is elevated to thereby equal the tension to the fence wires during all of the various positions that the gate may assume when its free end is raised as follows: Referring to Fig. 11 of the drawings, I provide between the uprights 11 near the hinged end of the gate two metal bars 24 pivoted between the uprights 11. Extended through each of these bars is a screw threaded rod 25 having a hook 26 at one end. In the other end of said screw threaded rod is a sleeve 27 and a nut 28 adjacent to the sleeve and in engagement therewith. In assembling these parts the hooks 26 are first connected with the bars 22 and then the rods 25 are extended through the parts 24 and 27 and the nut 28 is then placed thereon and drawn tight to thereby give the proper tension to the woven wire. The advantage of having the sleeve 27 is that it serves to space the nut 28 away from the adjacent uprights 11 so that an operator may readily and easily apply a wrench to said nut for adjusting the tension of the wire.

Referring to Fig. 5 of the drawings, it will be seen that the cross wires of the woven wire gate members are provided at their intersecting portions with substantially oblong wire loops 29, which loops are sufficient to permit the horizontal wires to swing a limited distance relative to the vertical wires without binding.

In practical operation with this portion of my invention and assuming that it is desired to prepare the gates for shipping or storing purposes, the operator first loosens the nuts 28 and then removes the hooks from the bars 22. He then also removes the bolts 21 whereupon the woven wire may be readily and easily detached and rolled up; then the friction bar 13 is moved forwardly so that the horizontal gate members 10 may lie close to each other to thereby occupy a minimum of space. Assuming that the gate is supported on a post by hinges, as shown, it is obvious that the free end of the gate may be supported at any desired position of elevation by simply moving the sliding friction bar longitudinally of the upper rail. This may be done very easily and without friction by first slightly elevating the free end of the gate. When the gate is in a substantially horizontal position or is slightly elevated then when the operator moves the free end of the gate upwardly the friction bar 13 will automatically move longitudinally of the gate and will frictionally engage the top gate member when the upward movement of the gate is stopped so that the gate is automatically clamped and locked in an elevated position whenever placed therein. However when it is desired to lower the gate the operator first raises it slightly and then by grasping one of the rods 15 and moving it forwardly the gate is free to swing downwardly and the parts are so arranged that the gate may move downwardly beyond a horizontal position so that its free end may rest upon the ground. The gate obviously will swing freely on its hinges when tilted to any angle. By having the bars 20 and 22 applied to the woven wire and by having the screw threaded rods pivotally connected with the bar 22, it is obvious that the gate may be adjusted to any incline without changing the adjustment or tension of the wires and by having the uprights 11 at the free end of the gate spaced apart from the ends of the horizontal gate members the said projecting ends may be used to coact with a gate supporting device as hereinafter described.

I have also provided improved means for supporting and holding the gate as follows: Adjacent to the free end of the gate is a fence post 30 and permanently fixed to it is a channel bar 31. At the upper and lower ends of said channel bar is a gate holding device firmly fixed in position and comprising two inclined guides 31ᵃ and a central notch 32, the latter being designed to receive the projecting ends of the upper and lower horizontal gate members. In order to hold the gate against upward movement as required to free it from the notches 32, I provide on the channel bar 31 near its center a pivoted plate 33 having an outwardly extended lower end 34. This is arranged as clearly shown in Fig. 1 to prevent upward movement of the gate by engaging the projecting end of the central horizontal gate member when the gate is elevated. However said device may freely swing to one side on its pivotal point to be out of the path of said gate member. In order to hold the gate in various positions of its adjustment, I have provided on the channel bar 31 a part 35 which extends outwardly from the fence post 30 and which is slightly curved at a circle centered at the hinged point of the gate and on this part 35 I have mounted a bracket 36 having arms 37 extended around the channel bar and in the rear of it, and I have also provided a thumb screw 38 extended through the bracket and designed to engage the front of the part 35. Obviously when the said set screw is loosened the bracket may be vertically adjusted on the part 35 and when the said screw is tightened the bracket will be firmly clamped to it on account of the arms 37. The said bracket is provided with a gate supporting device consisting of the two inclined guides 39 and a central notch 40, and at the upper portion of the bracket is a plate 41 pivoted at its top and having an outwardly extending portion 42 designed to prevent upward movement of a projecting gate member resting in the notch 40. In practical operation with this gate supporting device and assuming that it is desired to relieve the gate post of all strains by the gate, then I place the projecting ends of the horizontal gate members in the notches 32 of the stationary supporting device and I move the friction bar 13 forwardly so that the weight of the free end of the gate rests in said supporting device. Assuming however that it is desired to place the gate in position where it will freely swing to open or closed positions, I then so adjust the friction bar 13 that as the gate swings to closed position the projecting ends of the horizontal gate members will strike upon the guides 39 and be slightly elevated thereby, and then drop into the notches 40 so that the gate will automatically be latched when swung to closed position, and when in this position it will be held closed on account of the plate 41 which will normally hang in position to prevent the raising of the gate far enough from the notches 40. Assuming however that it is desired to support the gate with its free end in an elevated position as required to permit small animals to pass under it and to exclude larger ones, I first adjust the bracket 36 to the desired position of elevation on the part 35 and then place the lower horizontal gate member in the notch 40, whereupon the gate will be firmly held against swinging movement and also against up and down movement.

I claim as my invention:

1. An improved farm gate, comprising a number of horizontal gate members, a number of vertical gate members pivotally connected to the horizontal gate members and a wire gate member arranged between the horizontal gate members, said wire gate member being fixed at one end to the upright gate member at one end of the gate, a bar at the other end of the gate to which said wire gate member is fixed, two rods pivoted to the upright gate member at the side of the gate adjacent to said bar, two bars pivotally mounted in the uprights adjacent to said bar to which the wire is attached, a screw threaded rod having a hook on its end passed through each of said pivoted bars, said hooks being detachably connected to said bar to which the wire is attached, sleeves on the ends of the rods opposite from the hooks, and nuts on said rods to engage the sleeves for adjusting the tension of the wire.

2. An improved gate, comprising three horizontally arranged bars, a number of upright gate members, each consisting of two bars on opposite sides of the horizontal bars and pivotally connected therewith, two wire gate members arranged between the horizontal gate members, and each fixed at one end between the upright gate members, a bar fixed to the opposite end of the wire gate member, rods pivoted to said bar and also pivotally connected to the adjacent upright gate members, said wire gate members each being composed of a number of longitudinal wires, and a number of vertical wires, there being at the intersection of said wires a wire loop designed to permit the horizontal wires to move pivotally relative to the vertical wires without bending.

Des Moines, Iowa, March 26, 1910.

CHARLES D. HALDEMAN.

Witnesses:
MARY WALLACE,
A. G. HAGUE.

Copies of this patent may be obtained for five cents each, by addressing the "Commissioner of Patents, Washington, D. C."